United States Patent [19]

Dammon

[11] 4,245,524
[45] Jan. 20, 1981

[54] STEERING DIFFERENTIAL

[75] Inventor: James R. Dammon, West Lafayette, Ind.

[73] Assignee: Fairfield Manufacturing Company, Lafayette, Ind.

[21] Appl. No.: 958,907

[22] Filed: Nov. 8, 1978

[51] Int. Cl.³ ............................................. F16H 1/44
[52] U.S. Cl. ................................. 74/710.5; 74/714; 180/6.7
[58] Field of Search ............... 74/710.5, 714; 180/6.7; 74/781 R

[56] References Cited

U.S. PATENT DOCUMENTS

| Re. 14,938 | 8/1920 | White | 74/781 R X |
|---|---|---|---|
| 1,203,085 | 10/1916 | Wallace | 74/710.5 |
| 2,946,239 | 7/1960 | Hait | 74/710.5 |
| 3,260,134 | 6/1966 | Bowen et al. | 74/710.5 |

FOREIGN PATENT DOCUMENTS 1081816 12/1954 France ................................. 74/710.5

Primary Examiner—C. J. Husar
Assistant Examiner—Frank McKenzie
Attorney, Agent, or Firm—Aaron L. Hardt; Vance A. Smith

[57] ABSTRACT

An epicyclic steering differential for use with a vehicle that is driven by tracks provides steering control and differential action to the vehicle by way of a set of differential cluster gears disposed about the pitch circle of the control gears with which the cluster set mates, engaging concurrently each of two adjacent cluster gears of the set, and driving two oppositely disposed drive gears that ultimately transmit power to the tracks. Each cluster gear has a pitch diameter equal in size to that of the control gears. The clusters are arrayed about the control gears so that the pitch diameter of adjacent clusters are mutually tangent and tangent also with the control gear pitch circle. In this way cluster gear transmits power at two points of meshing contact.

5 Claims, 4 Drawing Figures

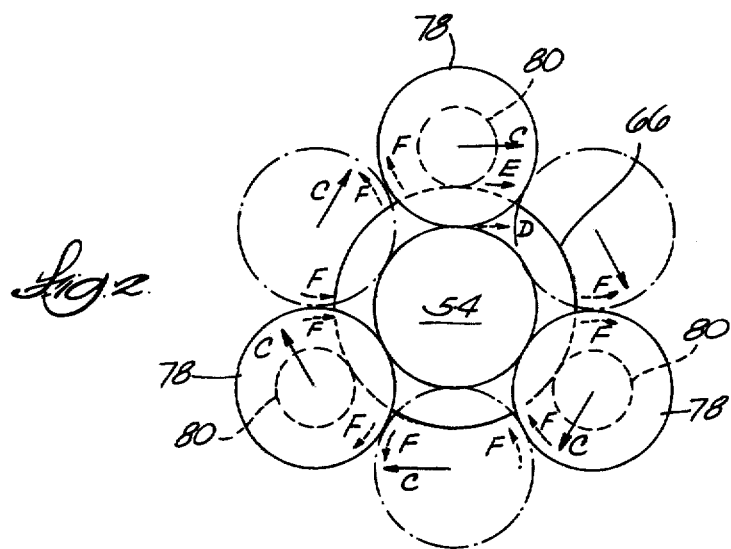
Fig. 2
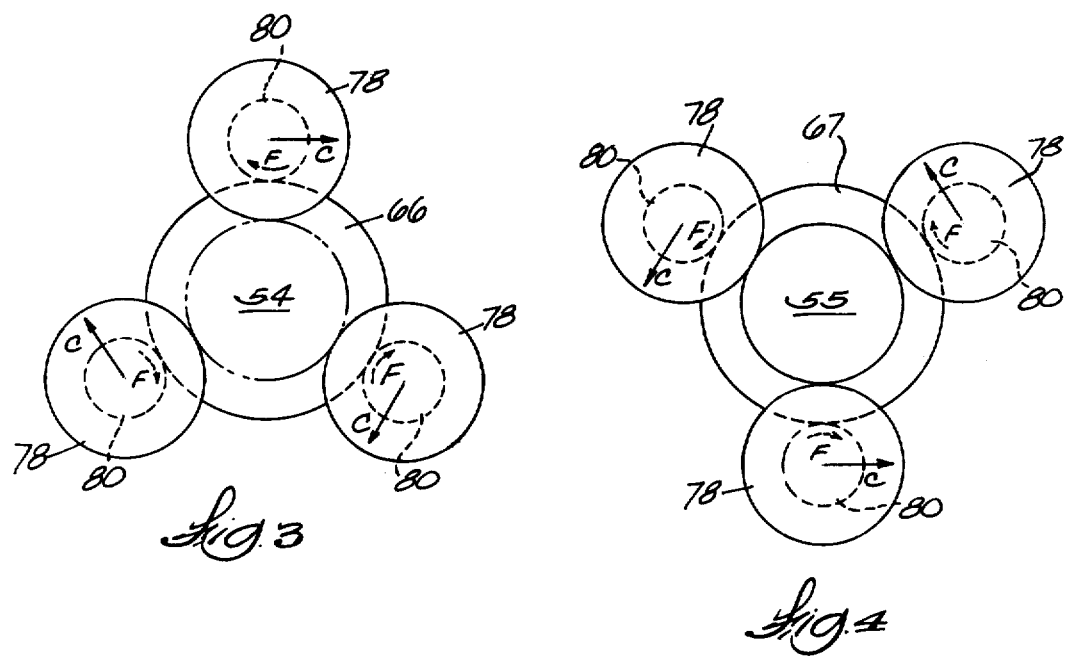
Fig. 3
Fig. 4

STEERING DIFFERENTIAL

BACKGROUND OF THE INVENTION

1. Field of the Invention

This invention relates to an epicyclic differential gear system and more particularly to an improved steering differential capable of transmitting power and providing steering control and braking action to the driving tracks of a tracked vehicle.

2. Description of the Prior Art

Conventional steering differentials have typically provided means for transmitting power, which is delivered axially to the unit by a drive shaft from a prime mover by way of a transmission, transversely to the tracks of a vehicle. Steering and differential action is provided by overdriving an output shaft that carries power to the tracks located on the side of the vehicle away from the direction of the turn or external load applied to the track and by underdriving a similar output shaft located on the same side of the vehicle as the direction of the turn or load. Braking action results when control shafts having mechanical brakes attached and extending outwardly away from the gearbox toward the tracks are made to slow or stop at equal rates of speed by actuating the brakes at each side of the vehicle uniformly.

Steering differentials known in the art have been limited by the requirement that the brakes used to determine the rotational speed of the control shafts be located within the space of the gearbox thereby restricting the access required for servicing and the range of brake types that can be used for various applications. Located within the gearbox, the brakes are susceptible to contamination by the gear lubricant and exposure to the high operating temperature of the system. Where brakes have been located outside the gearbox, their position has necessarily been maintained inboard of the power coupling device that connects the axle drive shaft carrying power to the wheels.

Service failures of the differential cluster gears have been a commonly recurring problem in steering differential units heretofore known because, typically, the cluster gears have been the smallest yet heaviest loaded of the unit. Each cluster runs with a single mating cluster and intermeshes with a single control gear. This arrangement requires that when the cluster set is made to transmit power to the opposite side for steering control or differential action, drive is transmitted at a single meshing contact point on each cluster gear.

BRIEF DESCRIPTION OF THE DRAWING

FIG. 2 is a modified longitudinal section taken at the plane 2—2 of FIG. 1, but including the entire set of differential cluster gears.

FIG. 3 is a partial section along plane 3—3 of FIG. 1, but including the entire set of differential cluster gears.

FIG. 4 is a partial section along plane 4—4 of FIG. 1, but including the entire set of differential cluster gears.

SUMMARY OF THE INVENTION

Figure 1:
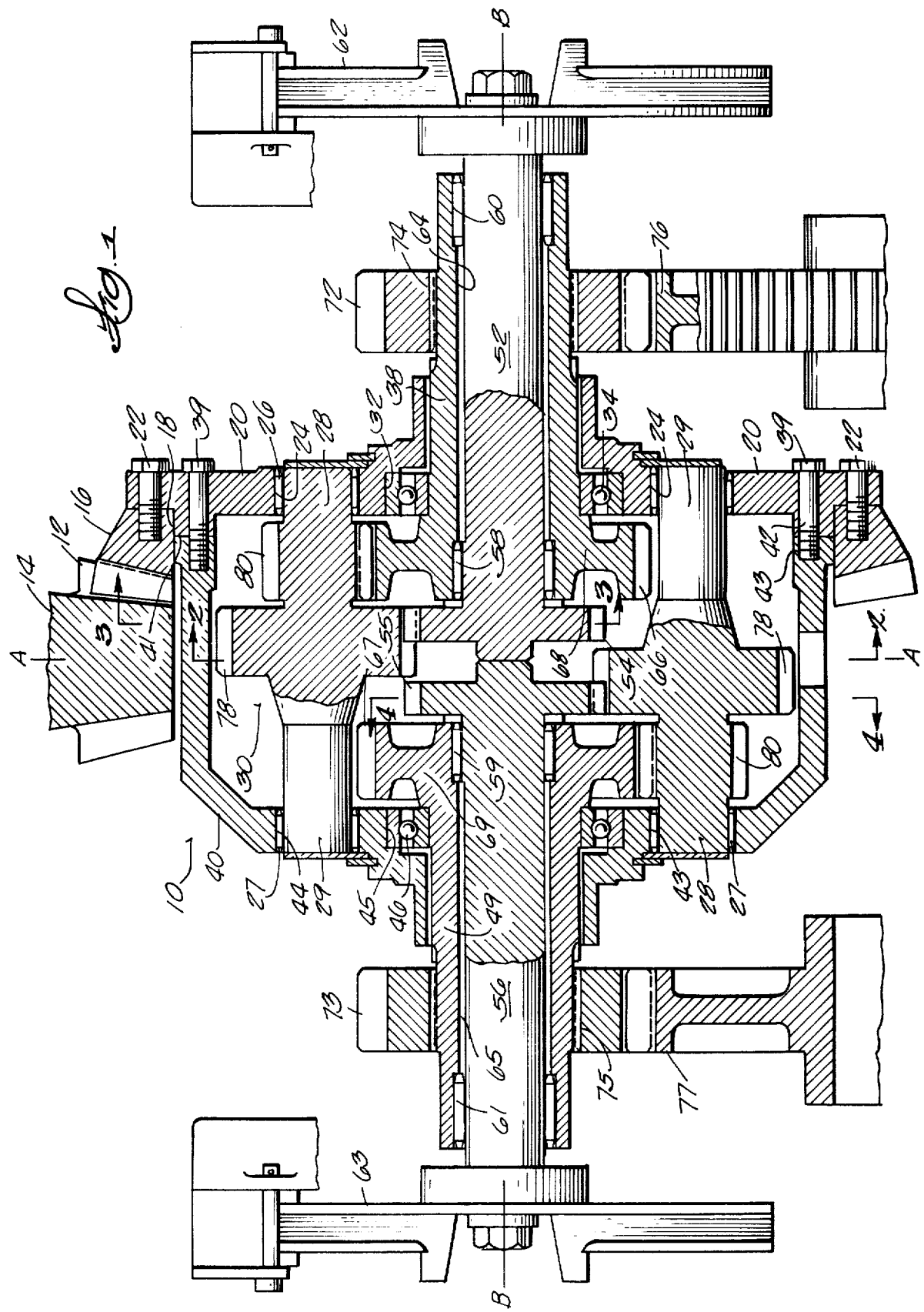
FIG. 1 is a plan section taken through the plane of the longitudinal and transverse axes of a steering differential according to the invention.

Among the several objects of the present invention may be noted the provision of a steering differential, which, in transmitting drive to the tracks of a vehicle, is capable of having steering control exerted by the application of brakes suited at any convenient location outside the housing of the differential unit; the provision for each cluster gear to engage two adjacent clusters of the differential cluster set for transmission of power in normal operation and when differential action or steering control is required; provision for the size of the mating cluster gears to be equal to or larger than other gears of the unit with which it mates; and a compact, efficient unit capable of a power rating at least twice the rating of conventional steering differentials of similar size.

In general, a steering differential according to the instant invention includes, among the improvements over the art, a set of six differential cluster gears having left and right hand configuration disposed alternatively and filling entirely the annular space around the circumference of the pitch circle of a pair of control gears whose pitch diameter is equal to that of the cluster gears. Each cluster gear engages its two adjacent clusters at the tangency points of their respective pitch circles and a second gear formed on each cluster engages a drive gear through which power is ultimately delivered to the vehicle tracks.

Control shafts concentric with the drive gears and fitted within the bores thereof extend transversely outward from the confines of the differential housing where mechanical or hydraulic brakes are attached and regulated by input from the vehicle operator in response to steering and other operational requirements.

DESCRIPTION OF THE PREFERRED EMBODIMENT

Turning now to a more specific description of this invention, attention is directed to FIG. 1, which illustrates details of a steering differential fabricated according to the invention. A longitudinal axis A—A about which drive is delivered to the unit, is a centerline of symmetry and intersects with a transverse axis B—B along which drive is transmitted to the vehicle tracks and steering control is applied.

Power is delivered to the differential 10 by pinion 12, which may be a spiral bevel or helical bevel gear of standard construction, attached to a main drive shaft 14 that transmits its power from the vehicle's engine or motor (not illustrated). A ring gear 16 having teeth sized for mating with pinion 12 is mounted on a shoulder 18 of housing 20 and is mechanically attached thereto by bolts 22 disposed around the circumference of the ring gear. Alternatively, ring gear 16 and housing 20 may be of unitary construction.

Housing 20 provides a plurality of circular holes 24 uniformly spaced apart around the circumference of a hole circle having as a radius the distance from the transverse centerline B—B to the center of the holes 24 and having a center coincident with the transverse centerline B—B. Bearings 26, preferably of the drawn cup type, are fitted within holes 24 and support one end portion 28 of the differential cluster gears 30 that are disposed around the hole circle and aligned coaxially with the holes 24. Housing 20 provides a recess 32 into which is fitted a bearing 34 whose inner race is supported on the surface of a drive gear 38 and whose outer race supports housing 20 and permits relative radial motion between the drive gear 38 and the housing 20, which housing has polar symmetry about the transverse centerline B—B.

A second housing 40 abuts housing 20 on an annular, radially-directed surface 41 and is attached thereto by means of a plurality of bolts 39 that are disposed about a bolt circle, which bolts fit into holes 42 through housing 20 and engage threaded holes 43 tapped into housing 40. Housing 40 provides a plurality of circular holes 44 uniformly spaced-apart around the circumference of a hole circle having as a radius the distance from the transverse centerline B—B to the center of the holes 44 and having a center coincident with the transverse centerline B—B. Bearings 27 are fitted within the holes 44 and support a second end portion 29 of the differential cluster gears 30. Housing 40 provides a recess 45 into which is fitted a bearing 46 whose inner race is supported on the surface of a drive gear 49 and whose outer race supports housing 40 and permits relative radial motion between drive gear 49 and housing 40.

A control shaft 52 has located at its inboard end concentric with the shaft axis, a gear 54 that meshes with a portion of the face of the central spur gear 78 of the differential cluster gear set 30. Control shaft 52 is located in the differential 10 coaxial with a second control shaft 56 that is identical to shaft 52 but arranged in the differential so that its inboard gear 55 is adjacent gear 54 and the shafts are symmetrically disposed about the longitudinal axis A—A. Each control shaft 52, 56 is fitted with an inboard bearing 58, 59 and an outboard bearing 60, 61 positioned to support the control shafts 52, 56 and to allow easy rotational motion relative to the drive gears 38, 49, respectively. The shafts 52, 56 provide portions that extend beyond the outboard bearings 60, 61 capable of having mechanically or hydraulically actuated brakes 62, 63 mounted thereon to control the rotational speed of control shafts 52, 56 in response to input from the vehicle operator.

Identical drive gears 38, 49 arranged with symmetry about the longitudinal axis A—A and polar symmetry with respect to the transverse axis B—B, comprise a generally cylindrical shaft portion having axial bores 64, 65 formed therein, extending outwardly over the respective control shafts 52, 56 from a gear portion 66, 67 that is machined integrally with the shaft portion and supported thereabove by a web 68, 69. Recesses on the internal diameter are provided at the inboard and outboard ends to accomodate the bearings, 58, 59, 60, 61. Gears 66, 67 have the same pitch diameter as and mesh respectively with gears 80, of the differential cluster set 30. Bearings 34, 46 fitted on the outer surfaces of drive gears 38, 49 bear upon shoulders formed or the surfaces and, in this way, position housings 20, 40 relative to the gears 66, 67.

Power is transmitted by the differential 10 to drive gears 38, 49 then ultimately to the tracks of the vehicle, which produce the driving, steering and braking action. In the illustration of FIG. 1, pinions 72, 73 situated outside housings 20, 40, are attached to the drive gears 38, 49 by mating splines 74, 75, which pinions comprise a gear portion in meshing engagement with the bull gears 76, 77. Ultimately, power is transmitted by the bull gears 76, 77 to the left and right tracks of the vehicle, but, of course, any mechanical means could be employed to interact with the drive gears and deliver power to the tracks. For example, a chain sprocket could be fixed to the drive gears 38, 49 at the splines 74, 75, which sprocket would driven an endless chain articulating on the drive gear sprocket at one extremity of the drive system and delivering power to a similar sprocket that is fixedly attached to the vehicle tracks, or to the structure that directly drives the tracks, at the opposite extremity.

A set of six differential cluster gears 30 is arrayed around the annular space that is bounded at its outer periphery by the housing 40 and at its inner periphery by the pitch circle circumference of the control shaft gears 54, 55. Each differential gear defines cylindrical end portions 28, 29 located at opposite ends of the gear, aligned coaxially therewith, and sized to fit within the bearings 26, 27 that are supported in the holes 24, 44 formed in housing 20, 40. A first spur gear 78 having a pitch diameter equal to that of the control shaft gears 54, 55 is formed on the central portion of each cluster gear 30, the face of which is aligned with the longitudinal axis of the cluster gears and the colinear axes B—B of the control shafts 52, 56 and the drive gears 38, 49. A second spur gear 80 in driving engagement with either drive gear 66 or 67 is formed adjacent the first gear portion 78.

The six cluster gears 30 are installed in the unit in alternate arrangement, three of them having the gear 80 positioned on the left side of vehicle longitudinal axis A—A and three on the right side. The central gear portion 78 of the three cluster gears 30 positioned with gear 80 to the right of axis A—A are in meshing engagement over approximately one-half of the face width of gear 78 with the control shaft gear 54 at the tangency point of their respective pitch circles. Likewise, the central gear portion 78 of the three cluster gears 30 positioned with gear 80 to the left of the vehicle longitudinal axis A—A are in meshing engagement over approximately one-half of the face width of gear 78 with control shaft gear 55 at the tangency point of their respective pitch circles.

In addition, each of the six cluster gears 30, arrayed alternately in left and right side configuration in the annular region, meshes with its two neighboring differentials at the tangency points of their respective pitch circles, as FIG. 2. illustrates. In this way, the differentials can be seen to entirely fill the annular region around the circumference of the control shaft pitch circle. Meshing engagement between mating cluster gears occurs over the remaining half face of the central gear 78 that does not engage the control shaft gears 54, 55.

Specifically, each cluster gear 30 of the right-hand configuration, i.e. the three clusters having gears 80 located to the right of the vehicle longitudinal axis A—A, engage two left hand cluster gears by developing meshing contact between the left half face of the right hand cluster gear and the right half face of the left hand cluster. Therefore, the central gear 78 of each differential 30 simultaneously meshes with the two adjacent cluster gears whose pitch circles are tangent thereto and either control gear 54, in the case of a right hand configuration differential, or control gear 55, in the case of a left hand configuration differential. In addition to these three points of meshing engagement, each cluster gear 30 is further affected by contact between its gear 80 and either the drive gear 66, in the case of a right hand configuration differential, cluster, or drive gear 67, in the case of a left hand configuration differential.

In normal operation, i.e. when power is delivered equally to the vehicle tracks on each side of the vehicle and the control shafts 52, 56 are unrestrained by the brakes, power from the vehicle prime mover is delivered by the drive shaft 14 to the spiral bevel pinion 12, which causes housings 20, 40 to rotate through driving engagement with ring gear 16. Since the control shafts 52, 56 are unrestrained, the cluster gears 30 will not rotate about their axes, but will revolve about the transverse vehicle axis B—B with the speed and direction of the housings 20, 40. The cluster gears 30 transmit power to drive gears 66, 67 simply by revolving about axis B—B, but rotation of the clusters 30 relative to the drive gears 66, 67 is precluded by virtue of the meshing arrangement between adjacent clusters.

This inability of the cluster gears to rotate when the control shafts 52, 56 are unrestrained and drive is delivered equally to the drive gears 38, 49 is explained with reference to FIG. 2. The rotation of housings 20, 40 about axis B—B imparts a rotational velocity, represented by vectors C, to the set of six cluster gears 30. Control gear 54 rotates with the cluster set at a speed indicated by vector D at the point of engagement with the clusters, and drive gear 66 is driven by the three cluster gears with which it meshes at a velocity represented by vectors E. Similarly, control gear 55 and drive gear 67 rotate, respectively, as vectors D and E indicate. The individual cluster gears do not rotate about their axes, but revolve as a unit about axis B—B. For cluster gear rotation to occur, one control gear 54 or 55 must be slowed relative to the other by the application of the brakes 62, 63 that are attached at the outer ends of the control shafts 52, 56. But for normal operation, i.e. where the brakes are not applied and drive is symmetrical about axis A—A, cluster gear rotation will not occur.

However, the unit has full differential action in normal operation. In the event one drive gear 52 or 56 is slowed or stalled by reason, e.g., of an obstruction in the path of the vehicle tracks on one side only, this slowing will produce rotation about the individual axes of the cluster threesome that meshes with the slowed drive shaft, but revolution about axis B—B of the housings 20, 40 and the entire planetary differential cluster set, as discussed previously, will continue.

With reference to FIG. 3 assuming drive gear 66 is the one slowed, the three clusters gears that engage drive gear 66 and control gear 54 acquire rotation as represented by vectors F. Rotation is produced because the housings 20, 40 continue to drive the cluster threesome at velocity C, but points at the contact of gears 80 and 66 are caused to reduce speed by the slowing action of drive gear 66. Of course, the full set of cluster gears simultaneously is caused to rotate due to the rotational continuity required to exist therebetween by the meshing engagement of each cluster with its two neighboring clusters. FIG. 2 illustrates the rotational vector F applied to the full cluster set and satisfying the continuity requirement.

In FIG. 4, in respect of the left hand cluster threesome that meshes with drive gear 67, rotation vector F is seen to add to vector C, at the points where drive is transmitted to drive gear 67. Conversely, in FIG. 3, in respect of the right hand cluster threesome that meshes with drive gear 66, vector F subtracts from vector C, at the points where the gear 80 meshes with drive gear 66. Drive is thereby transmitted from the slowed drive gear 66 across to the opposite drive gear 67. Furthermore, the rotational speed of drive gear 67 will increase and decrease inversely as the speed of drive gear 66 varies.

In a similar manner, assuming that the drive gears 66, 67 are initially driven at equal speeds, steering control is provided by way of application of the brakes to one or the other of the control shafts 52, 56. For example, slowing of the control shaft 52 produces rotation of the right hand cluster threesome that engages control gear 54 and drive gear 66, and causes rotation in the left hand cluster threesome by reason of the meshing engagement of the entire set of clusters gears 30. Revolution of the cluster gear set about the transverse axis B—B is superimposed upon the rotational motion that steering control produces. Slowing of control gear 52 produces the rotations indicated in FIGS. 2, 3 and 4 by vectors F and in this way drive gear 66 is seen to be underdriven when control shaft 52 is slowed. Conversely, drive gear 67 is overdriven when control shaft 52 is slowed since the rotation imparted to the second cluster threesome adds to the original direction of drive, as illustrated in FIG. 4 vectors C and F being additive at the tangency of drive gear 67 and the left hand cluster threesome.

As a consequence of the functional symmetry of the differential, control forces applied to the drive gears that produce a slowing or stalling effect as a result of changes in the external load and control forces initiated by the vehicle operator to modify the speed of the control shafts, which control has been heretofor expressed in terms of action upon the drive gear 38 and control shaft 52 on the right side of the vehicle, could be applied to the left side or any combination of left and right control. In each instance, the identical effect in respect of underdriving the drive gear on the side of the vehicle to which control forces are applied and overdriving the opposite drive gear results, as was described heretofor.

Although the invention has been described with respect to a preferred embodiment, it will be appreciated that various changes and modifications may be made therein without departing from the spirit and scope of the invention, and thus it is not intended to limit the invention except by the terms of the following claims.

I claim:

1. A steering differential for a vehicle driven by first and second tracks comprising in combination:

a housing located between said tracks and having means thereon permitting said housing to be driven in rotation by a prime mover of said vehicle, first and second control gears coaxially aligned and rotatably mounted within said housing on respective first and second control gear shafts which extend outwardly from said housing in opposite directions to respective locations outwardly of said first and second tracks, said control gears capable of having their rotational speeds controlled independently, first and second drive gears for transmitting drive respectively and independently to said first and second tracks, said drive gears rotatably mounted within said housing on respective first and second hollow drive gear shafts which respectively ensleeve said first and second control gear shafts and have means associated therewith to respectively drive said first and second tracks, a first set of cluster gears rotatably mounted within said housing in meshing engagement with said first control gear and said first drive gear, said first cluster gears equally spaced around the pitch diameter of said first control gear on respective first cluster gear shafts, a second set of cluster gears rotatably mounted within said housing in meshing engagement with said second control gear and said second drive gear, said second cluster gears equally spaced around the pitch diameter of said second control gear on respective second cluster gear shafts, each of said first and second cluster gears respectively located between and in meshing engagement with two adjacent cluster gears of said second and first sets; and first and second brake means respectively located outwardly of said first and second tracks at the respective outer ends of said first and second tracks at the respective outer ends of said first and second control gear shafts for individually controlling the rotational speeds of said control gears, whereby a variation of the rotational speed of either said control gear or drive gear in engagement with one set of said cluster gears produces rotation of each gear of said first and second set of cluster gears, which results in an opposite variation of the rotation speed of the other said drive gear.

2. The steering differential of claim 1 wherein said control and drive gears are substantially at the ends of their respective shafts within said housing and said control gears are located in said housing inwardly of said drive gears.

3. The steering differential of claim 1 wherein each said cluster gear of said first and second sets includes separate gear wheels for said meshing engagement with its respective said control and drive gears.

4. The steering differential of claim 3 wherein said separate gear wheels for meshing engagement with said control gears have pitch diameters that are equal in size to the pitch diameter of said control gears, each said separate gear wheel for meshing engagement with said control gear of one set respectively located between and in meshing engagement with two adjacent separate gear wheels for meshing engagement with said control gear of the other set.

5. The steering differential of claim 1 wherein said first and second sets of cluster gears each consists of three cluster gears.

* * * * *